United States Patent Office 3,090,917
Patented May 21, 1963

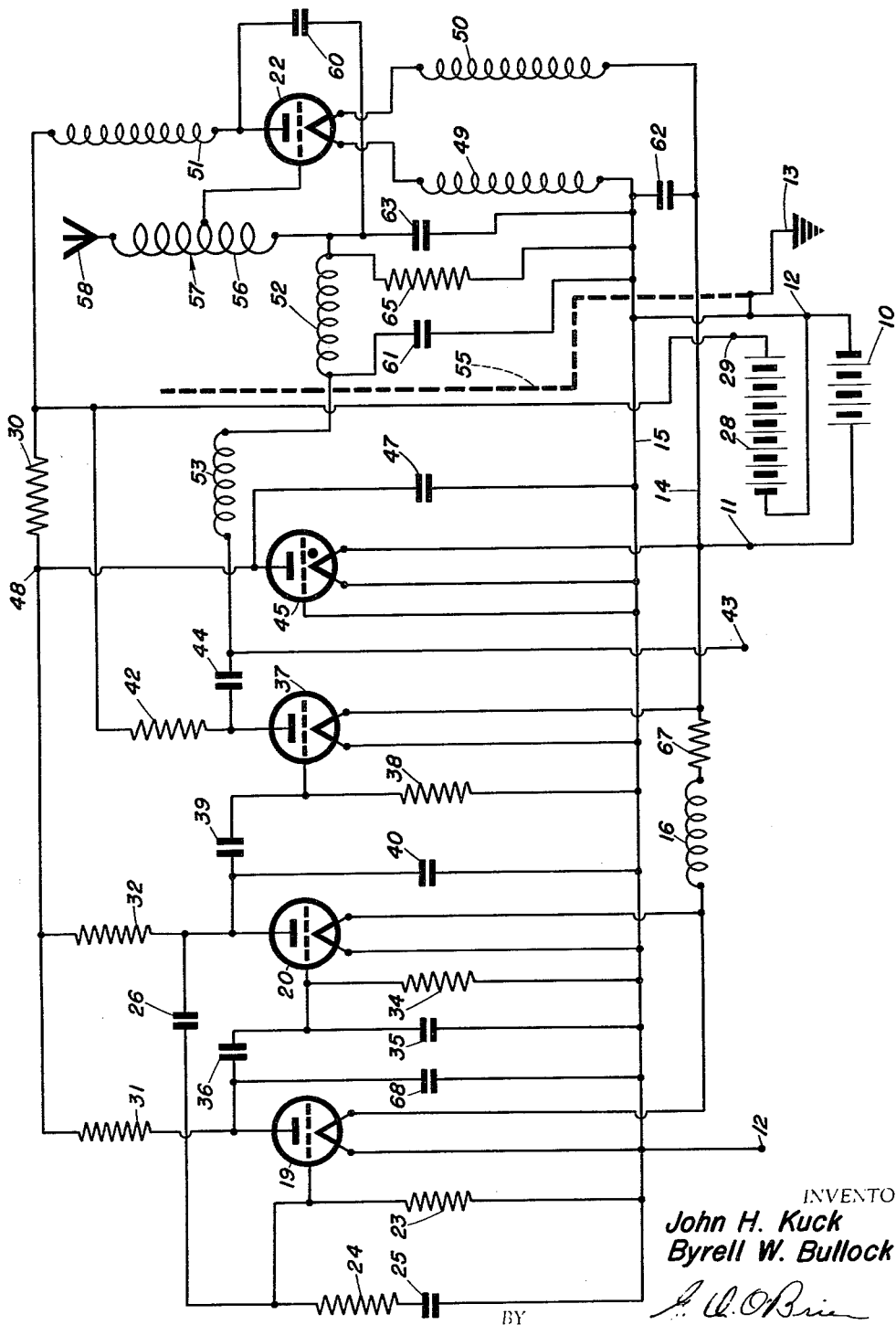

3,090,917
TRANSMITTER FOR RADIO-SONDE BATTERY
POTENTIAL INDICATIONS
John H. Kuck, Washington, D.C., and Byrell W. Bullock, Silver Spring, Md., assignors to the United States of America as represented by the Secretary of the Navy
Filed Mar. 26, 1946, Ser. No. 657,183
3 Claims. (Cl. 325—133)

The present invention relates to electrical circuits for producing and amplifying electrical oscillations having a characteristic indicative of variations in a supply voltage. It particularly relates to a radio-sonde circuit arrangement of the type in which the frequency of an audio-frequency signal is indicative of the behavior of a supply-voltage source included therein.

When the constants of an electrical signaling circuit in accordance with the present invention have proportions represented by the values disclosed herein, it is found that oscillations of audio frequency are produced, and that these oscillations vary in pitch or frequency in accordance with the cathode emission of one or more of the electronic tubes included in the audio-frequency oscillator circuit, which emission in turn depends upon the cathode temperature and thus upon the voltage of the source of tube-heating current. It is thus practicable to measure the voltage of that source by measuring the pitch of the audio-frequency signal, and this affords a way of ascertaining the condition and behavior of an inaccessible source of current, such as a battery carried by a free balloon or by a projectile in flight.

An object of the invention is, therefore, to provide an improved radio-sonde circuit arrangement adapted to be so carried, by a projectile or balloon, along with the battery, and having such characteristics that the greatest possible change of pitch relative to any variation of cathode heating voltage is produced, for the purpose of attaining maximum accuracy in the observation of the behavior of the battery.

Since the entire arrangement is inaccessible it is necessary that these audio-frequency oscillations be transmitted to a receiving station at the observing point. A further object of the invention is to provide in the arrangement means for employing the audio-frequency signals to modulate radio-frequency oscillations transmitted by another circuit included in the arrangement. The radio-frequency signals are then received in the ordinary way.

The accompanying drawing is a diagram of a radio-sonde circuit arrangement in accordance with the invention.

The first three tubes are coupled entirely by resistance and capacitive means. All of these tubes are of the three-element type and have filamentary cathodes.

A battery 10 supplies energy at the terminals 11 and 12, the latter being grounded at 13. This battery energizes the parallel-connected cathodes of all the tubes through the conductors 14 and 15. An inductor 16 is placed in the battery lead 14, between tube 37 and tubes 19 and 20 to act as a choke opposing the passage to tubes 19 and 20 of radio-frequency energy generated by the tube 22, through the filament circuit.

Tubes 19 and 20 comprise a conventional multivibrator. The first tube 19 has a plate resistance of 21,400 ohms, an amplification factor of 15 and its grid is connected to ground through a 1 megohm resistor 23 and through another megohm resistor 24 in series with a 0.004 microfarad condenser 25. Tube 19 operates at zero bias on its grid (except for some possible self-biasing in condenser 25 after oscillations have started). Resistor 67 is a filament voltage dropping resistor, provided to reduce that voltage to such a point that the oscillator is very sensitive to variations in filament voltage. Elements 24 and 25 increase sensitivity. Current scientific theory indicates that these components 24, 25 affect the phase and/or magnitude of the excitation of tube 19 at the low frequency end of the operating range in a beneficial manner. The grid is also coupled to the plate of tube 20 by a 0.001 microfarad condenser 26. Plate current is supplied at a suitable voltage from a battery 28 connected to terminals 29 and 12, the plates of tubes 19, 20 and 45 each being in series with a 20,000 ohm resistor 30, the latter being in series with source 28. Tubes 19 and 20 each have an individual resistor 31, 32 of 100,000 ohms in series with its plate.

The grid of the second tube 20, which is of the same type as tube 19, is connected to ground through a 50,000 ohm resistor 34, in parallel with a 0.006 microfarad condenser 35 and is coupled to the plate of tube 19 through a 0.00035 microfarad condenser 36. Condenser 68 functions together with the variable plate resistance of tube 19 to give the first stage a gain vs. frequency characteritsic which changes with filament voltage. As filament voltage increases the tube $r_p$ drops, resulting in reduced by-passing of signal at the higher frequencies by condenser 68. Consequently, the circuit tends to oscillate at higher frequency.

Other components in both stages also contribute similar effects. Condensers 36 and 39 in conjunction with variable grid to filament impedances also form filter sections which vary stage gain and phase versus frequency characteristics with filament voltage in a manner which aids the frequency shift.

Condenser 36 constitutes what may be designated as the normal or forward coupling from the plate of tube 19 to the grid of tube 20, while condenser 26 provides a feedback from the plate of tube 20 to the grid of tube 19. As the result of the values of the constants given and the tubes specified, oscillations in the audio-frequency range are produced.

The third tube 37, of the same type as tubes 19 and 20, has a grid connected to ground through a 5 megohn resistor 38 and coupled to the plate of tube 20 by a condenser 39 of 0.004 microfarad capacity. A by-pass condenser 40 of a capacity of 0.002 microfarad connects the plate of tube 20 to ground. The plate of tube 37 is connected to the positive plate-supply-source terminal 29 through a 50,000 ohm resistor 42 and is coupled through capacitor 44, having a capacitance of 0.04 microfarad, to terminal 43. Audio-frequency energy may be taken from terminal 43 if desired.

The tube 45 here illustrated is of the gas-filled grid-controlled type known as a "Thyratron," designed to break down at 90 volts on the plate when the grid is at —2.7 volts, but here connected as a diode, the grid being connected to the filamentary cathode. This tube contains one of the rare gases at low pressure and has an approximately constant voltage drop of nearly 16 volts between plate and cathode when connected as here disclosed. Tube 45 therefore serves to maintain the plate voltage supplied to tubes 19 and 20 substantially constant in spite of possible variations in the output voltage of battery 28. There is a by-pass condenser 47 of 0.001 microfarad from the plate of tube 45 to ground. The voltage from terminal 29 is applied to tubes 19 and 20 after dropping by resistors 30, 31 and 32 and after being made substantially constant between point 48 and ground 13, 15 by the operation of tube 45. This removes what would otherwise be a troublesome fluctuation of the plate voltage of tubes 19 and 20 and causes the pitch of the audio-frequency oscillations generated by tubes 19 and 20 and their associated circuit to depend practically entirely on the cathode-heating voltage applied to those two tubes, that is, the voltage of battery 10, the latter voltage being that whose behavior is to be observed.

If the terminal 43 were accessible, the audio-frequency energy could be taken directly from that terminal and the battery voltage indicated by the audio-frequency signal itself. This affords a convenient way of testing the accuracy of the whole circuit arrangement while it is still located on the surface of the earth.

In order to make these audio-frequency signals available after the device carrying the circuit arrangement is in flight or is inaccessible for some other reason, a modulation coupling is made to a circuit for producing radio frequency oscillations. This circuit includes a tube 22, of the same type as tube 19. Chokes 49, 50, 51 and 52 are provided for keeping the radio-frequency energy out of the other portions of the circuit as far as possible, both in order to prevent it from modifying in any way the frequencies existing in the circuits of tubes 19, 20 and 37 and in order to prevent waste of the radio-frequency energy, so as to radiate as much of it as possible. Additional chokes 53 and 16 are further provided in order to isolate the circuits of tubes 19, 20 and 37 from the radio-frequency circuit. A grounded shield 55 further isolates the high-frequency oscillator circuit from the remaining circuits. The oscillator including tube 22 operates at a very high frequency, well over 100 megacycles, so that distributed capacitances and inductances assume great importance. The interelectrode capacities existing between the tube elements themselves are sufficient to act as the frequency-determining parameters of an oscillator resembling the Colpitts type, with a tank coil 56 comprising a portion of a helix 57, the remainder of the helix acting as a transformer winding to increase the voltage applied to the antenna 58. Condensers 60, 61, 62 and 63, each 50 micromicrofarads, are by-pass condensers and resistor 65, of 10,000 ohms, is the grid resistor for tube 22.

The operation of the circuit is as follows. The whole circuit arrangement is included in a radio sonde which is installed in a projectile fired from a gun or is otherwise caused to assume flight. It is desired to study the behavior of battery 10 during conditions of flight. The circuit arrangement has such overall operation that the voltage of source 10 affects the frequency of the audio-frequency signals generated by tubes 19 and 20 and their associated circuits. These audio-frequency signals are modulated on carrier-signals generated by tube 22 and its associated circuit and the modulated wave signals are radiated by the antenna system 58. At a point of observation the radio-frequency signals are detected and the modulation components derived therefrom. By observations of the frequency of the modulation components, i.e., the audio-frequency signals, the behavior of source 10 becomes known. In explaining the operation of the audio frequency signal generator comprising tubes 19 and 20, it is first assumed that tube 19 is non-conductive. Under that assumed condition condenser 36 is charged by battery 28 through a time-constant circuit comprising resistor 30, resistor 31, condenser 36, resistor 34, and ground. When tube 19 is non-conductive, tube 20 is conductive. However, the charge which is being built up on condenser 36 is of such a polarity as to tend to render tube 20 less conductive, since the path of electron flow in charging condenser 36 is from ground through resistor 34. Tube 20 becomes non-conductive when the potential on condenser 36 has built up to a sufficient value. When tube 20 becomes non-conductive its plate potential increases and the signal regeneratively sent back through condenser 26 from the plate of tube 20 to the grid of tube 19 is such as to render the last-mentioned grid more positive, thereby tending to make tube 19 more conductive. As tube 19 becomes more conductive its plate potential becomes less positive and the plate of tube 19 therefore applies, through condenser 36, to the grid of tube 20, a potential which tends to render tube 20 less conductive. The result is that tube 20 is sharply cut off and tube 19 becomes sharply conductive. Tube 20 now being blocked, capacitor 26 charges through a time-constant circuit comprising resistors 30 and 32, capacitor 26 and resistor 23. While capacitor 26 is charging the flow of electrons in resistor 23 is such as to tend to make tube 19 less conductive. While condenser 26 is being charged, condenser 36 discharges through a time-constant circuit comprising the anode-cathode path of tube 19, ground, resistor 34 and condenser 36. Condenser 36 holds tube 20 blocked until it has lost its charge. Similarly, condenser 26 holds tube 19 blocked until it has lost its charge. Condenser 26 discharges through a time-constant path comprising condenser 26, resistor 23, ground, and tube 20 when tube 20 is conductive and tube 19 is blocked. It will be apparent that the resultant operation of tubes 19 and 20 is the appearance at the input of tube 37 and at terminal 43 of a strong audio-frequency signal. Since the frequency of this signal is determined in part by the time-constants of the charging and discharging paths of condensers 26 and 36 and since the impedance of these discharge paths is affected by the cathode-to-anode voltages of tubes 19 and 20, the frequency of the audio-frequency signals is changed by reason of a change in the potential between the more positive portions of the tube cathodes, these being connected to terminal 11, and the anode.

At the same time tube 45 eliminates disturbances occasioned by reason of variations in the voltage of battery 28. Tube 45 accomplishes this function by reason of the fact that when connected as a diode the voltage between the plate and cathode is automatically limited to the breakdown voltage corresponding to the contained gas, in the neighborhood of 16 volts.

The audio-frequency signals produced by the signal generating circuit including tubes 19 and 20 are amplified by tube 37 and its associated circuit and the amplified signal is applied to the modulation input circuit of the radio-frequency generating tube 22, varying its output signal accordingly and modulating the output radio-frequency energy in accordance with the audio-frequency signals.

By tests on the ground the arrangement comprising the above-described circuit is so calibrated that the functional relationship between the voltage of battery 10 and the pitch of the audio-frequency received signals is predetermined. This information is used to determine the battery voltage when the device is in flight or otherwise inaccessible, by receiving the modulated high-frequency signal with any appropriate radio receiver and translating the pitch indications into corresponding indications of battery voltage.

While there has been shown and described what is at present considered to be a preferred embodiment of the present invention, it will be obvious to those skilled in the art that various changes and modifications may be made therein without departing from the true spirit thereof, and it is, accordingly, intended in the appended claims to cover all such changes and modifications as fall within the true scope of the invention and without that of the prior-art. The circuit dimensions hereinabove mentioned are intended to be illustrative and not to be limitations. We have found the dimensions given for components 23, 24, 25, 26, 36, 34 and 40 effective in so unbalancing the multivibrator as to give satisfactory sensitivity in one successful embodiment of our invention.

We claim:

1. In a radio sonde having a transmitter including an oscillator having a modulation circuit, and a battery, a battery potential indicator comprising a multivibrator including a pair of hot cathode triode tubes, a source of plate potential for said tubes, said source including a plate battery, an impedance and a gaseous discharge device connected in series circuit relation across said plate battery, said discharge device having a substantially constant anode to cathode potential over a wide range of applied potentials, connections applying the potential of said device to said multivibrator, said battery connected to supply the heating current of the cathodes of said multivibrator, a resistor connected in series circuit relation between said battery and said multivibrator, said resistor dropping the applied potential to such a point that the multivibrator is sensitive to variations in cathode potential whereby variations in battery potential vary the frequency of said multivibrator, and connections impressing the variable frequency of said multivibrator on said modulation circuit.

2. In a battery potential indicator for a radio sonde having a radio frequency oscillator, and a modulation circuit controlling the output frequency of the oscillator, an alternating current generator having a frequency responsive to the potential of the battery, comprising a multivibrator, a source of plate potential for said multivibrator, a voltage stabilizer including an impedance and a gas filled triode connected as a diode across said source of potential, connections impressing the potential drop across said diode on said multivibrator, a battery, connections impressing the potential of said battery to provide heating current to the cathodes of said multivibrator, an impedance for adjusting the cathode heating potential to the critical range of the multivibrator whereby any variation of the battery potential varies the frequency of said multivibrator, and connections for impressing the output frequency of the multivibrator on the modulation circuit.

3. In a radio sonde having a radio frequency oscillator and a modulation circuit for modulating the output of the oscillator, a battery potential indicator, comprising a multivibrator including a pair of electron tubes, said tubes being triodes having heated cathodes, a source of plate potential for said tubes, means for deriving a constant potential from said source, connections impressing said constant potential on said tubes, a battery the potential of which is to be indicated, connections supplying heating current from said battery to said tubes, an impedance reducing the applied cathode potential to a point where the multivibrator is sensitive to variations of applied potential whereby the output frequency of the multivibrator varies with variations of battery potential, and connections for impressing the variable frequency of said multivibrator on said modulation circuit.

References Cited in the file of this patent

UNITED STATES PATENTS

| | | |
|---|---|---|
| 1,533,157 | Beatty | Apr. 14, 1925 |
| 1,801,466 | Townsend | Apr. 21, 1931 |
| 2,061,734 | Kell | Nov. 24, 1936 |
| 2,063,610 | Linsell | Dec. 8, 1936 |
| 2,228,367 | Sanders | Jan. 14, 1941 |
| 2,398,761 | Aiken | Apr. 23, 1946 |
| 2,403,624 | Wolff | July 9, 1946 |
| 2,444,479 | Trevor | July 6, 1948 |